(12) United States Patent
Lau et al.

(10) Patent No.: US 6,740,364 B2
(45) Date of Patent: May 25, 2004

(54) METHOD OF DEPOSITING A COMPOSITIONALLY-GRADED COATING SYSTEM

(75) Inventors: Yuk-Chiu Lau, Ballston Lake, NY (US); Hongyu Wang, Schnectady, NY (US); David Joseph Mitchell, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/063,967

(22) Filed: May 30, 2002

(65) Prior Publication Data

US 2003/0224124 A1 Dec. 4, 2003

(51) Int. Cl.[7] .................................. C23C 4/10
(52) U.S. Cl. .................. 427/452; 427/455; 427/419.3; 427/419.7
(58) Field of Search ................ 427/452, 454, 427/455, 419.3, 419.7

(56) References Cited

U.S. PATENT DOCUMENTS 6,180,184 B1 * 1/2001 Gray et al. ................. 427/453

6,444,335 B1 * 9/2002 Wang et al. ................. 428/701

FOREIGN PATENT DOCUMENTS

EP 1 142 850 A1 * 10/2001

* cited by examiner

*Primary Examiner*—Katherine A. Bareford
(74) *Attorney, Agent, or Firm*—Ernest Cusick; Gary M. Hartman; Domenica N. S. Hartman

(57) ABSTRACT

A process for depositing a ceramic coating system for Si-containing materials, particularly those for articles exposed to high temperatures. The process is particularly applicable to depositing a compositionally-graded coating system comprising multiple ceramic layers with differing compositions, including a dense, strain-tolerant, vertically-cracked YSZ-containing ceramic layer deposited on a ceramic layer having a composition that is a mixture of YSZ and either mullite or BSAS. The process entails depositing the YSZ-containing ceramic layer using a plasma spraying technique while maintaining the substrate at a temperature so as not to form horizontal cracks in the coating system, but still maintain the dense vertically-cracked structure of the YSZ-containing ceramic layer for strain tolerance.

25 Claims, 5 Drawing Sheets

METHOD OF DEPOSITING A COMPOSITIONALLY-GRADED COATING SYSTEM

FEDERAL RESEARCH STATEMENT

This invention was made with Government support under Agreement No. F33615-98-C-2893 awarded by the U.S. Department of the Air Force. The Government has certain rights in the invention.

BACKGROUND OF INVENTION

1. Field of the Invention

The present invention generally relates to coating systems suitable for protecting components exposed to high-temperature environments, such as the hostile thermal environment of a gas turbine engine. More particularly, this invention is directed to a process of depositing a graded thermal/environmental barrier coating system on a composite substrate material.

2. Description of the Related Art

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through formulation of iron, nickel and cobalt-base superalloys. While superalloys have found wide use for components throughout gas turbine engines, alternative materials have been proposed. For example, composite materials, particularly silicon-based composites with silicon carbide (SiC) as a matrix and/or as a reinforcing material, are currently being considered for high temperature applications, such as combustor liners, airfoils, nozzles and other hot section components of gas turbine engines.

In many high temperature applications, a protective coating is beneficial or required for a Si-containing material. For example, protection with a suitable thermal-insulating layer reduces the operating temperature and thermal gradient through the material. Additionally, such coatings should provide environmental protection by inhibiting the major mechanism for degradation of Si-containing materials in a corrosive water-containing environment, namely, the formation of volatile silicon monoxide (SiO) and silicon hydroxide ($Si(OH)_4$) products. Consequently, besides low thermal conductivity, a critical requirement of a thermal barrier coating system for a Si-containing material is stability in high temperature environments containing water vapors. Other important properties for the coating material include a coefficient of thermal expansion (CTE) compatible with the SiC-containing material, low permeability for oxidants, and chemical compatibility with the Si-containing material and silica scale formed from oxidation. As a result, suitable protective coatings for turbine engine components formed of Si-containing materials essentially have a dual function, serving as a thermal barrier and simultaneously providing environmental protection. A coating system having this dual function may be termed a thermal/environmental barrier coating (T/EBC) system.

Various single-layer and multilayer T/EBC systems have been investigated for use on Si-containing substrates. Coatings of zirconia partially or fully stabilized with yttria (YSZ) as a thermal barrier layer exhibit excellent environmental resistance. However, YSZ does not adhere well to Si-containing materials (SiC or silicon) because of a CTE mismatch (about 10 ppm/° C. for YSZ as compared to about 4.9 ppm/° C. for SiC/SiC composites). Mullite ($3Al_2O_3.2SiO_2$) has been proposed as a bond coat for YSZ on Si-containing substrate materials to compensate for this difference in CTE (mullite having a CTE of about 5.5 ppm/° C.), though mullite exhibits significant silica activity and volatilization at high-temperatures if water (water vapor) is present. Barium-strontium-aluminosilicate (BSAS) coatings have also been proposed as a protective coating for Si-containing materials in view of its excellent environmental protection properties and low thermal conductivity. In addition, BSAS has been proposed as a bond coat for YSZ in U.S. Pat. No. 5,985,970 to Spitsberg et al., assigned to the assignee of the present invention.

As application temperatures increase further beyond the thermal capability of a Si-containing material (limited by a melting temperature of about 2560° F. (about 1404° C.) for silicon), relatively thick coatings capable of withstanding higher thermal gradients are required. However, as coating thicknesses increase, strain energy due to the CTE mismatch between individual coating layers and the substrate increases as well, which can cause debonding and spallation of the coating system. As a solution, U.S. Pat. No. 6,444,335 to Wang et al. discloses a compositionally-graded T/EBC system that exhibits improved mechanical integrity for high application temperatures. The T/EBC system includes an intermediate layer containing YSZ and mullite, alumina and/or an alkaline-earth metal aluminosilicate (preferably BSAS). The intermediate layer is used in combination with a mullite-containing layer that overlies the surface of a Si-containing substrate, a layer of an alkaline-earth metal aluminosilicate (again, preferably BSAS) between the mullite-containing layer and the intermediate layer, and a thermal-insulating topcoat of YSZ overlying the intermediate layer. An optional silicon bond layer may be deposited on the substrate prior to depositing the mullite-containing layer. The mullite-containing layer has a CTE above that of a Si-containing substrate but less than that of the YSZ topcoat, and therefore compensates for the difference in CTE between the Si-containing substrate and the other coating layers. In addition, the mullite-containing layer serves as a chemical barrier between BSAS layer and the Si-containing substrate to prevent interaction of BSAS with the silicon oxidation product ($SiO_2$) at high temperatures. The BSAS layer provides environmental protection to the silicon-containing substrate, while the YSZ topcoat offers thermal protection to the Si-containing substrate and the other underlying layers of the coating system. Finally, the intermediate layer serves as a thermal barrier layer that also provides a CTE transition between the BSAS layer and the YSZ topcoat as a result of its BSAS, mullite and/or alumina content, each of which has a CTE between that of YSZ and Si-containing materials.

In view of the above, the compositionally-graded T/EBC disclosed by Wang et al. is able to reliably provide both thermal and environmental protection to a Si-containing substrate at high temperatures. Another desirable feature of the T/EBC of Wang et al. is that each of its ceramic layers can be readily deposited by known deposition techniques, particularly air plasma spraying. Nonetheless, further improvements are continuously sought. For example, though the coating system taught by Wang et al. makes use of a carefully tailored combination of coating materials, horizontal cracking and spallation has been observed in the intermediate layer and the YSZ topcoat following thermal cycling at high temperatures. Accordingly, it would be desirable if the microstructure and mechanical integrity of this coating system could be enhanced.

SUMMARY OF INVENTION

The present invention generally provides a process for depositing a ceramic coating system for Si-containing materials, particularly those for articles exposed to high temperatures, including the hostile thermal environment of a gas turbine engine. Examples of such materials include those with a dispersion of silicon carbide, silicon carbide and/or silicon reinforcement material in a metallic or non-metallic matrix, as well as those having a silicon carbide, silicon nitride and/or silicon-containing matrix, and particularly composite materials that employ silicon carbide, silicon nitride and/or silicon as both the reinforcement and matrix materials (e.g., SiC/SiC ceramic matrix composites (CMC)).

The invention is particularly applicable, though not limited, to depositing the compositionally-graded T/EBC system disclosed by Wang et al., and is tailored to improve the mechanical integrity of this T/EBC system when deposited on silicon-containing substrates used in high temperature combustion environments. As such, coatings deposited with this invention comprise multiple ceramic layers with differing compositions, and particularly a dense, strain-tolerant, vertically-cracked YSZ-containing ceramic layer that is deposited on a second ceramic layer having a composition different than the YSZ-containing ceramic layer. Particularly suitable compositions for the second ceramic layer include the intermediate layer disclosed by Wang et al., namely, a layer containing YSZ and mullite, alumina and/or an alkaline-earth metal aluminosilicate (preferably BSAS), and especially a mixture consisting essentially of YSZ and either mullite or BSAS. The method entails depositing the YSZ-containing ceramic layer using a plasma spraying technique while maintaining the silicon-containing substrate at a temperature of not greater than about 600° C., and more preferably not higher than about 450° C. to about 550° C., depending on the composition of the second ceramic layer on which the YSZ-containing ceramic layer is deposited.

According to this invention, a compositionally-graded T/EBC deposited on a silicon-containing substrate and comprising a dense, strain-tolerant, vertically-cracked YSZ-containing layer deposited on a second ceramic layer containing a mixture of YSZ and BSAS or mullite has been shown to exhibit improved mechanical integrity and thermal cycle fatigue life if the deposition process for the YSZ-containing layer is carefully controlled so that the temperature of the silicon-containing substrate does not exceed about 600° C. A particularly suitable temperature for the substrate is about 450° C. if the second ceramic layer (on which the YSZ-containing layer is deposited) contains YSZ and BSAS, and a particularly suitable temperature for the substrate is about 550° C. if the second ceramic layer contains YSZ and mullite. Limiting the deposition temperature in this manner has been associated with the avoidance of fine horizontal cracks, which are believed to promote wrinkling and eventually spallation of the T/EBC, while maintaining the desired dense vertically-cracked structure of the YSZ-containing ceramic layer for strain tolerance. Therefore, by limiting the deposition temperature, the microstructure and mechanical integrity of the coating system can be enhanced, leading to a longer component life.

Other objects and advantages of this invention will be better appreciated from the following detailed description.

DETAILED DESCRIPTION

The present invention is generally applicable to components that operate within environments characterized by relatively high temperatures, and are therefore subjected to severe thermal cycling and stresses, oxidation, and corrosion. Notable examples of such components include combustor components, high pressure turbine vanes, and other hot section components of gas turbine engines, though the invention has application to other components.

Figure 2:
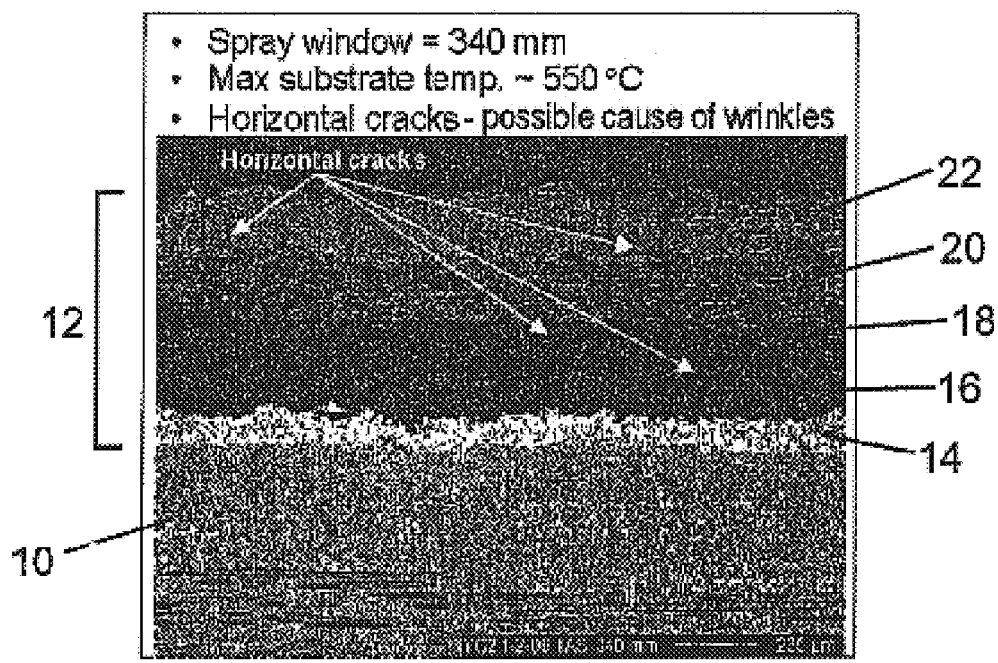
FIG. 2 is a scanned image of a cross-sectional view of an as-deposited thermal/environmental barrier coating system containing horizontal cracks.

FIG. 2 is a scanned image of a cross-section of a substrate 10 on which a multilayer T/EBC system 12 has been deposited. The substrate 10 is formed of a SiC/SiC CMC, though the invention is generally applicable to other materials containing silicon in any form. The coating system 12 is representative of the coating system disclosed in U.S. Pat. No. 6,444,335 to Wang et al., and as such includes a thermal-insulating topcoat 22 that provides environmental protection to the underlying substrate 10 as well as reduces the surface temperature of the substrate 10 and interior layers 14, 16, 18 and 20 of the coating system 12. The preferred material for the topcoat 22 is YSZ, preferably containing about 7 to about 10 weight percent yttria, though it is foreseeable that other ceramic materials could be used. A suitable thickness range for the YSZ topcoat 22 is about 12.5 to about 1250 micrometers (about 0.0005 to about 0.050 inch), with a preferred range of about 125 to about 750 micrometers (about 0.005 to about 0.030 inch), depending on the particular application.

The major mechanism for degradation of silicon carbide (as well as silicon and other silicon compounds) in a corrosive environment is the formation of volatile silicon monoxide (SiO) and silicon hydroxide ($Si(OH)_4$) products. The diffusivity of oxidants in the YSZ topcoat 22 is generally very high. Therefore, in order to protect the Si-containing substrate 10, the coating system 12 must include additional layers beneath the topcoat 22 that, individually or in combination, exhibit low diffusivity to oxidants, e.g., oxygen and water vapor, to inhibit oxidation of the silicon carbide within the substrate 10, while also being sufficiently chemically and physically compatible with the substrate 10 to remain adherent under severe thermal conditions. In FIG. 2, these additional layers of the coating system 12 include a layer 16 containing a mixture of mullite and an alkaline-earth metal aluminosilicate, preferably BSAS (hereinafter, mullite/BSAS layer 16), and a layer 18 of an alkaline-earth metal aluminosilicate, again preferably BSAS (hereinafter, BSAS layer 18). Finally, separating the BSAS layer 18 and the topcoat 22 is a YSZ-containing fourth layer 20 that also contains mullite or an alkaline-earth metal aluminosilicate, again preferably BSAS. This fourth layer 20 will be referred to as the transition layer 20 below. In accordance with the teachings of Wang et al., the above combination of interior layers 16, 18 and 20 provides a graded composition that fulfills the requirements noted above.

The innermost layer seen directly on the substrate 10 in FIG. 2 is an optional silicon layer 14. In accordance with U.S. Pat. No. 6,299,988 to Wang et al. the inclusion of the silicon layer 14 is useful to improve oxidation resistance of the substrate 10, and enhances bonding of the mullite/BSAS layer 16 to the substrate 10 if the substrate 10 contains SiC or silicon nitride ($Si_3N_4$). A suitable thickness for the silicon layer 14 is about 25 to about 250 micrometers (about 0.001 to about 0.010 inch).

The mullite/BSAS layer 16 serves to adhere the BSAS and YSZ-containing layers 18 and 20 to the Si-containing substrate 10, while also preventing interactions between the BSAS layer 18 and the Si-containing substrate 10 at high temperatures. Mullite is a desirable constituent of this layer 16 because of its chemical stability with Si-containing materials at high temperatures. The layer 16 preferably contains BSAS (and may even be entirely BSAS) for applications with temperatures below about 1300° C. The addition of BSAS to the layer 16 is also relatively compatible with the Si-containing substrate 10 in terms of having a CTE of about 5.27 ppm/° C., as compared to a CTE of about 4.9 ppm/° C. for SiC/SiC CMC. A suitable thickness range for the mullite/BSAS layer 16 is about 25 to about 250 micrometers (about 0.001 to about 0.010 inch), depending on the particular application.

The BSAS layer 18 overlying the mullite/BSAS layer 16 provides excellent environmental protection and exhibits good thermal barrier properties due to its low thermal conductivity. Particularly, BSAS is able to serve as an environmental barrier to the underlying mullite/BSAS layer 16, which as a result of its mullite content would exhibit significant silica activity and volatilization if exposed to water vapor at high temperatures. As a result, the BSAS layer 18 is able to inhibit the growth of an interfacial silica layer at the substrate 10 when the component 10 is exposed to the oxidizing environment of a gas turbine engine. In addition, BSAS is physically compliant with a SiC-containing substrate, such as the substrate 10, and is relatively compatible with the mullite/BSAS layer 16 and the Si-containing substrate 10 in terms of CTE. A suitable thickness range for the BSAS layer 18 is about 125 to about 1000 micrometers (about 0.005 to about 0.040 inch), depending on the particular application.

Finally, according to Wang et al. the transition layer 20 is desirable to promote the ability of the coating system 12 to thermally and environmentally protect the Si-containing substrate 10 over numerous thermal cycles and at elevated temperatures. In a preferred embodiment, the transition layer 20 is a substantially homogeneous mixture of about 50 volume percent YSZ and 50 volume percent of either BSAS or mullite, though other proportions are foreseeable. Alternatively, the transition layer could be made up of discrete sublayers, each with a different composition, or be a continuously changing composition from essentially all YSZ adjacent the YSZ topcoat 22 to essentially all BSAS or mullite adjacent the BSAS layer 18.

The YSZ constituent of the transition layer 20 serves to increase its overall CTE to something closer to the YSZ topcoat 22. An advantage of using mullite with YSZ in the transition layer 20 includes the high temperature capability of mullite as compared to BSAS. On the other hand, because BSAS exhibits low silica activity and low diffusivity to oxidants, a transition layer 20 that contains BSAS is able to serve as an environmental barrier to the underlying substrate 10. Simultaneously, additions of BSAS to the layer 20 render this layer 20 more compatible with the underlying BSAS layer 18 in terms of CTE. Advantageously, BSAS exhibits sufficient environmental resistance such that, if the YSZ topcoat 22 were to spall, an underlying transition layer 20 containing BSAS could continue to provide a level of environmental protection to the mullite/BSAS layer 16 and Si-containing substrate 10. A suitable thickness for the transition layer 20 is up to about 500 micrometers (up to about 0.020 inch), depending on its composition, the particular application, and the thickness of the other layers 16, 18 and 22. High application temperatures, e.g., up to 2000° C., necessitate thick protective coating systems, generally on the order of 250 micrometers or more. It is with such coating systems that the benefits of the transition layer 20 become particularly important to the mechanical integrity of the coating system 12.

As with prior art thermal barrier and environmental coatings, the layers 16, 18, 20 and 22 can be individually deposited by air and vacuum plasma spraying (APS and VPS, respectively), though it is foreseeable that deposition could be performed by other known techniques, such as high velocity oxy-fuel (HVOF). Thereafter, a heat treatment may be performed after deposition of the individual layers 16, 18, 20 and 22 to relieve residual stresses created during cooling from elevated deposition temperatures. The coating system 12 shown in FIG. 2 was deposited by air plasma spraying.

In an investigation leading up to the present invention, the microstructure and mechanical integrity of coating systems of the type described above were found to vary considerably. According to the present invention, this variation in microstructure and mechanical integrity was determined to be dependent at least in part on the temperature of the substrate 10, hereinafter the deposition temperature, during the application of the YSZ topcoat 22. For the specimen shown in FIG. 2, the YSZ topcoat 22 was deposited at a deposition temperature of about 550° C. on a 50/50 vol. % YSZ/BSAS transition layer 20. The YSZ topcoat 22 is seen to be dense with vertical cracks that are desirable for improved strain tolerance. However, horizontal cracks (cracks parallel to the surface of the substrate 10) can also be seen within the BSAS layer 18, the transition layer 20 and the YSZ topcoat 22 in the as-deposited condition. Also apparent in FIG. 2, the microstructure of the coating system 12 can be seen to have a wrinkled appearance.

Figure 3:
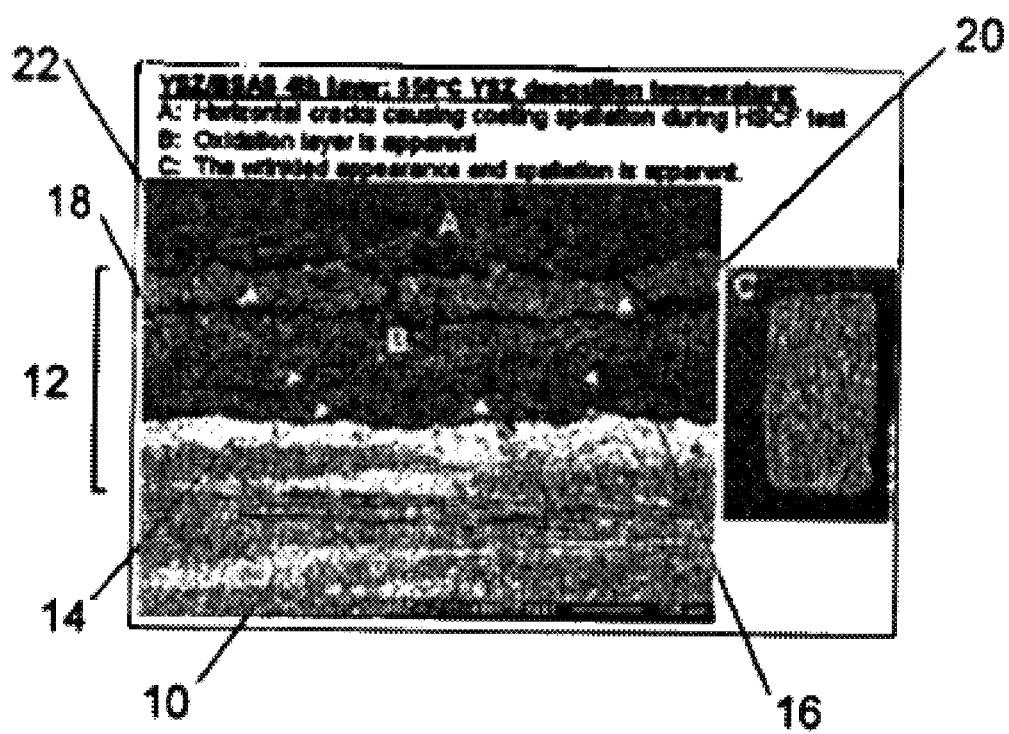
FIG. 3 is a scanned image of a cross-sectional view of a coating system essentially identical to FIG. 1 and following thermal cycling.

FIG. 3 represents an identical coating system after undergoing a high steam cycle furnace (HSCF) test to assess the durability and protective capability of the coating system. During the HSCF test, the specimen was exposed to 250 thermal cycles between room temperature and about 2400° F. (about 1315° C.) over a period of 500 hours in a flowing atmosphere of about 90% $H_2O$ and about 10% $O_2$. In FIG. 3, the damage to the microstructure of the coating system is apparent when compared with the microstructure shown in FIG. 2. While not wishing to be held to any particular theory, the horizontal cracks and wrinkled appearance seen in FIG. 2 were believed to be the result of stresses due to thermal expansion mismatch between the layers 16, 18, 20 and 22 during deposition, and that the horizontal cracks propagated during thermal cycling, causing the enlarged cracks and spallation seen in FIG. 3. As such, the presence of the horizontal cracks was concluded to be detrimental to the mechanical integrity of the coating system, and therefore the protection provided by the coating system.

Figure 1:
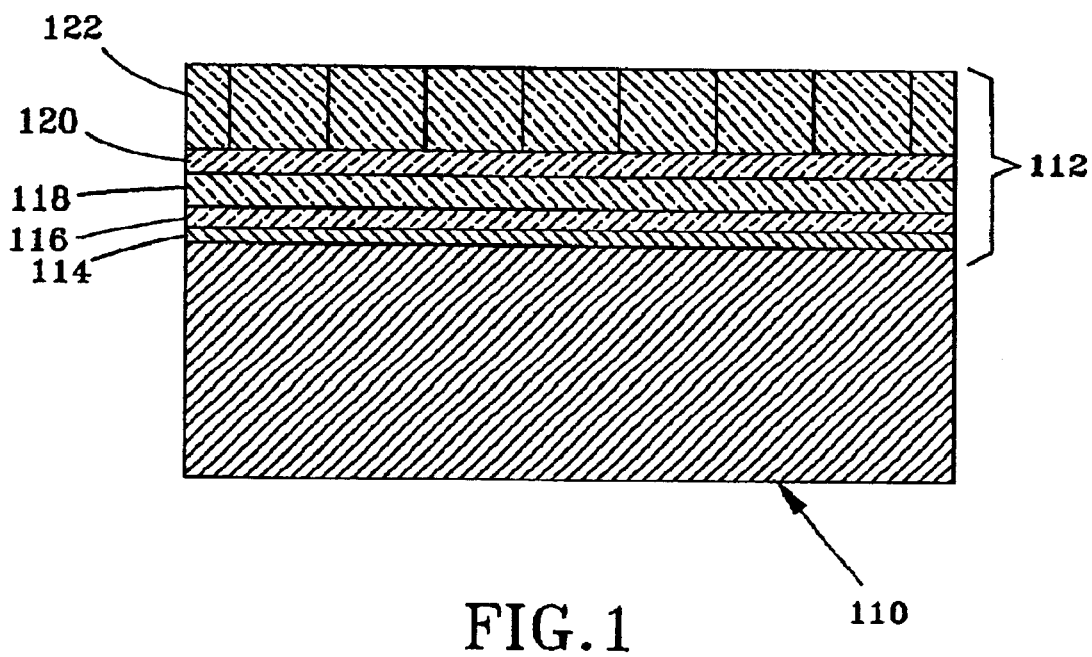
FIG. 1 is a cross-sectional representation of a thermal/environmental barrier coating system of the present invention.
Figure 4:
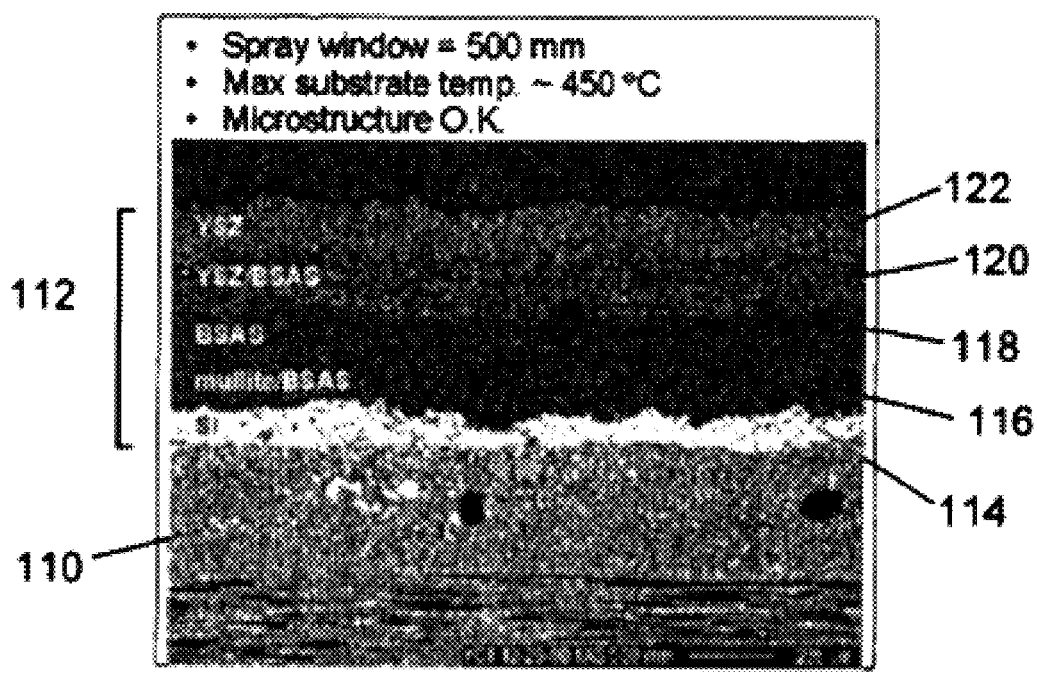
FIG. 4 is a scanned image of a cross-sectional view of a thermal/environmental barrier coating system as deposited in accordance with this invention.

In contrast to FIG. 2, FIG. 4 shows the microstructure of a second coating system 112 on a substrate 110 essentially identical to the substrate 10 of FIGS. 2 and 3. Also similar to the coating system 12 of FIGS. 2 and 3, the coating system 112 of FIG. 4 includes a silicon layer 114, a mullite/BSAS layer 116, a BSAS layer 118, a 50/50 vol. % YSZ/BSAS transition layer 120, and a dense, strain-tolerant, vertically-cracked YSZ topcoat 122. The coating system 112 of FIG. 4 is schematically represented in FIG. 1. The specimen shown in FIG. 4 was essentially identical to that of FIG. 2, except that the YSZ topcoat 122 was deposited on the YSZ/BSAS transition layer 120 at a deposition temperature of about 450° C., instead of 550° C. From FIG. 4, it is apparent that horizontal cracks of any significant size are absent from the BSAS layer 118, the transition layer 120 and the YSZ topcoat 122 in the as-deposited condition, though the desirable vertical cracks are present. Also apparent in FIG. 4, the surface of the coating system 112 is smoother than the coating system 12 of FIG. 2, corresponding to a smoother surface appearance in contrast to the wrinkled appearance of FIG. 2.

From the above, it was concluded that reducing the deposition temperature to something below about 550° C. when depositing a YSZ topcoat 122 on a YSZ/BSAS transition layer 120 was necessary to produce a coating system 112 with a strain-tolerant microstructure and enhanced mechanical integrity. While a suitable temperature is about 450° C. based on this investigation, it was concluded that deposition temperatures of up to about 500° C. are acceptable when depositing YSZ on a transition layer containing a mixture of YSZ and BSAS or another alkaline-earth metal aluminosilicate. A minimum deposition temperature of about 300° C. is believed to be necessary for there to occur localized remelting and formation of a coherent columnar structure within the YSZ topcoat 122, in accordance with the teachings of commonly-assigned U.S. Pat. Nos. 5,830,586 and 6,180,184 to Gray et al.

Figure 5:
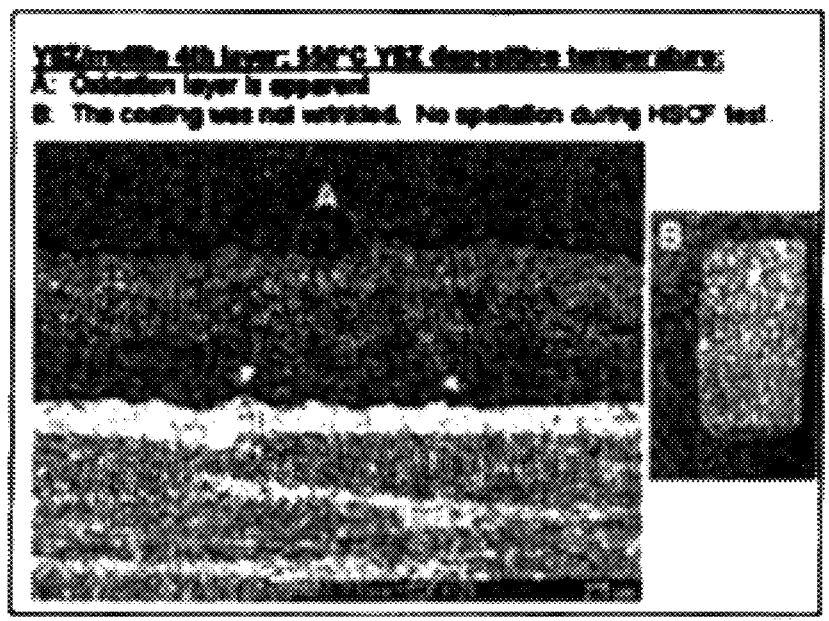
FIG. 5 is a scanned image of a cross-sectional view of a thermal/environmental barrier coating system deposited in accordance with this invention and following thermal cycling.

FIG. 5 shows the microstructure of a T/EBC system after HSCF testing under the same conditions as those experienced by the specimen shown in FIG. 3. For this specimen, a dense, strain-tolerant, vertically-cracked YSZ topcoat was deposited at a deposition temperature of about 550° C. on a 50/50 vol. % YSZ/mullite transition while the remaining layers are essentially identical to the specimens of FIGS. 2 through 4. Similar to the specimen of FIG. 4, in the as-coated condition the BSAS layer, the transition layer and the YSZ topcoat were free of horizontal cracks of any significant size, though the desirable vertical cracks are present. The coating system also did not have a wrinkled appearance prior to testing. Finally, FIG. 5 evidences that the deposition process by which the coating system was formed did not result in the development of large horizontal cracks or spallation during thermal cycling. Accordingly, it was concluded that, though unacceptable when depositing a YSZ topcoat on a YSZ/BSAS transition layer (as done in FIG. 4), a deposition temperature of about 550° C. was acceptable for a coating system having a transition layer containing YSZ and mullite. It was subsequently concluded that deposition temperatures of less than 600° C. would be acceptable when depositing YSZ on a YSZ/mullite transition layer, in terms of producing a strain-tolerant microstructure with enhanced mechanical integrity. As with coating systems utilizing a YSZ/BSAS transition layer, a minimum deposition temperature of 300° C. is believed to be a required when depositing YSZ on a YSZ/mullite transition layer.

At this point, it should be noted that commonly-assigned U.S. Pat. Nos. 5,830,586 and 6,180,184 to Gray et al. disclose a thermal barrier coating (TBC) with a coherent, columnar microstructure comprising multiple layers of YSZ deposited by plasma spraying while maintaining a deposition temperature in the range of about $0.2T_m$ (about 300° C. for YSZ) to about $0.5T_m$ (about 1200° C. for YSZ), where $T_m$ is the absolute melting temperature of the material (e.g., YSZ) being deposited. The YSZ TBC is deposited on a metallic bond coat, and each YSZ layer is said to cause localized remelting of the underlying deposition (YSZ) surface, resulting in the entire TBC having a coherent columnar structure if the deposition temperature is in the range of about $0.2T_m$ to $0.5T_m$. The degree of columnarity is expected to increase with increasing deposition surface temperature with an onset temperature of about $0.2T_m$ (about 300° C. for YSZ). This coherent columnar structure is critical to the strain tolerant capability of the TBC. In any event, Gray et al. advocate higher deposition temperatures, preferably 600° C. or higher (about $0.29T_m$ for YSZ). In the present invention, a high deposition temperature, e.g., above 450° C. for deposition of a YSZ topcoat 22 on a YSZ/BSAS transition layer 20, was determined to cause undesirable horizontal cracks in the underlying coating layers 16, 18 and 20, which was attributed to the CTE mismatch of the YSZ topcoat 22 with the underlying coating layers 16, 18 and 20. According to the present invention, to deposit a strain-tolerant YSZ top coat 122 with a coherent columnar structure and without undesirable horizontal cracks, the deposition temperature must be at least 300° C. and not significantly higher than about 450° C. or about 550° C., depending on the composition of the transition layer 120. Such limitations are contrary to the teachings of Gray et al., who teach that deposition temperatures of 600° C. and higher are beneficial for the coating system taught by Gray et al.

While the invention has been described in terms of a preferred embodiment, it is apparent that other forms could be adopted by one skilled in the art. Accordingly, the scope of the invention is to be limited only by the following claims.

What is claimed is:

1. A method of depositing a dense, strain-tolerant, vertically-cracked yttria-stabilized zirconia (YSZ) containing ceramic layer on a second ceramic layer present on a substrate, the second ceramic layer having a composition consisting essentially of either a combination of YSZ and mullite or a combination of YSZ and an alkaline-earth metal aluminosilicate so as to have a coefficient of thermal expansion lower than the YSZ-containing ceramic layer, the method comprising the step of depositing the YSZ-containing ceramic layer using a plasma spraying technique while maintaining the substrate at a temperature of not greater than 600° C. if the composition of the second ceramic layer contains the combination of YSZ and mullite, and a temperature of not greater than 500° C. if the composition of the second ceramic layer contains the combination of YSZ and alkaline-earth metal aluminosilicate.

2. A method according to claim 1, wherein the substrate is maintained at a temperature of at least about 300° C. during the depositing step.

3. A method according to claim 1, wherein the YSZ-containing ceramic layer consists essentially of YSZ.

4. A method according to claim 3, wherein the second ceramic layer is a mixture consisting of the YSZ and either mullite or an alkaline-earth metal aluminosilicate.

5. A method according to claim 1, wherein the composition of the second ceramic layer contains the combination of YSZ and mullite.

6. A method according to claim 5, wherein the second ceramic layer contains about 50 volume percent mullite and about 50 volume percent YSZ.

7. A method according to claim 5, wherein the substrate is maintained at a temperature of up to about 550° C. during the depositing step.

8. A method according to claim 1, wherein the composition of the second ceramic layer contains the combination of YSZ and alkaline-earth metal aluminosilicate.

9. A method according to claim 8, wherein the second ceramic layer contains about 50 volume percent barium-strontium-aluminosilicate (BSAS) and about 50 volume percent YSZ.

10. A method according to claim 8, wherein the substrate is maintained at a temperature of about 450° C. during the depositing step.

11. A method according to claim 1, wherein the second ceramic layer has a substantially uniform composition.

12. A method according to claim 1, wherein the second ceramic layer comprises sublayers, an innermost sublayer of the sublayers having a substantially uniform composition of either mullite or alkaline-earth metal aluminosilicate, an outermost sublayer of the sublayers contacting the YSZ-containing ceramic layer and having a substantially uniform composition of YSZ.

13. A method according to claim 1, wherein the second ceramic layer is compositionally graded, consists essentially of either mullite or alkaline-earth metal aluminosilicate at an innnermost region of the second ceramic layer nearest the substrate, and consisting essentially of YSZ at an outermost region of the second ceramic layer contacting the YSZ-containing ceramic layer, the second ceramic layer having a decreasing concentration of mullite or alkaline-earth metal aluminosilicate and an increasing concentration of YSZ in a direction toward the YSZ-containing ceramic layer.

14. A method of forming a thermal/environmental barrier coating system on a substrate formed of a silicon-containing material, the method comprising the stops of:

depositing a silicon-containing bond coat on the substrate;

depositing a mullite-containing first layer on the bond coat;

depositing a second layer on the first layer, the second layer consisting essentially of barium-strontium-aluminosilicate (BSAS);

depositing a third layer on the second layer, the third layer consisting essentially of yttria-stabilized zirconia (YSZ) and either mullite or BSAS; and depositing a dense, strain-tolerant vertically-cracked topcoat on the third layer using a plasma spraying technique while maintaining the substrate at a temperature of not greater than 600° C. if the third layer consists essentially of YSZ and mullite, and a temperature of not greater than 500° C. if the third layer consists essentially of YSZ and BSAS, the topcoat consisting essentially of YSZ and having a coefficient of thermal expansion higher than the third layer.

15. A method according to claim 14, wherein the third layer consists essentially of YSZ and mullite, and the substrate is maintained at a temperature of about 300° C. to about 550° C. during the step of depositing the topcoat.

16. A method according to claim 15, wherein the third layer contains about 50 volume percent mullite and about 50 volume percent YSZ.

17. A method according to claim 14, wherein the third layer consists essentially of YSZ and BSAS, and the substrate is maintained at a temperature of about 300° C. to about 450° C. during the step of depositing the topcoat.

18. A method according to claim 17, wherein the third layer contains about 50 volume percent BSAS and about 50 volume percent YSZ.

19. A method according to claim 14, wherein the third layer has a substantially uniform composition.

20. A method according to claim 14, wherein the third layer comprises sublayers, an innermost sublayer of the sublayers having a substantially uniform composition of either mullite or BSAS, an outermost sublayer of the sublayers contacting the topcoat and having a substantially uniform composition of YSZ.

21. A method according to claim 14, wherein the third layer is compositionally graded, consists essentially of either mullite or BSAS at an innermost region of the third layer nearest the substrate, and consisting essentially of YSZ at an outermost region of the third layer contacting the topcoat, the third layer having a decreasing concentration of mullite or BSAS and an increasing concentration of YSZ in a direction toward the topcoat.

22. A method according to claim 14, wherein the first layer is mullite or a mixture of mullite and BSAS.

23. A method according to claim 14, wherein the first layer consists essentially of mullite.

24. A method according to claim 14, wherein the substrate is formed of a material selected from the group consisting of metal matrix composites reinforced with silicon carbide, silicon nitride and/or silicon, composites having a matrix of silicon carbide, silicon nitride and/or silicon, and composites with a silicon carbide, silicon nitride and/or silicon matrix reinforced with silicon carbide, silicon nitride and/or silicon.

25. A method according to claim 14, wherein the substrate is a surface of a gas turbine engine component.

* * * * *